(12) United States Patent
Wolrich et al.

(10) Patent No.: US 7,437,724 B2
(45) Date of Patent: Oct. 14, 2008

(54) REGISTERS FOR DATA TRANSFERS

(75) Inventors: Gilbert Wolrich, Framingham, MA (US); Mark B. Rosenbluth, Uxbridge, MA (US); Debra Bernstein, Sudbury, MA (US); Matthew J. Adiletta, Bolton, MA (US); Hugh M. Wilkinson, III, Newton, MA (US)

(73) Assignee: Intel Corporation, Santa Clara, CA (US)

( * ) Notice: Subject to any disclaimer, the term of this patent is extended or adjusted under 35 U.S.C. 154(b) by 552 days.

(21) Appl. No.: 10/116,670

(22) Filed: Apr. 3, 2002

(65) Prior Publication Data

US 2003/0191866 A1  Oct. 9, 2003

(51) Int. Cl.
  *G06F 9/46* (2006.01)
  *G06F 7/38* (2006.01)
  *G06F 9/00* (2006.01)
  *G06F 9/44* (2006.01)
  *G06F 15/00* (2006.01)

(52) U.S. Cl. .............. 718/100; 712/220; 712/225; 712/228; 712/229

(58) Field of Classification Search ............. 718/107, 718/100; 712/1–43, 200–248; 719/310, 719/312–314; 710/200–244; 711/108
See application file for complete search history.

(56) References Cited

U.S. PATENT DOCUMENTS

| | | | |
|---|---|---|---|
| 3,373,408 A | 3/1968 | Ling | |
| 3,478,322 A | 11/1969 | Evans | |
| 3,577,189 A | 5/1971 | Cocke et al. | |
| 3,792,441 A | 2/1974 | Wymore et al. | |
| 3,881,173 A | 4/1975 | Larsen et al. | |
| 3,913,074 A | 10/1975 | Homberg et al. | |
| 3,940,745 A | 2/1976 | Sajeva | |
| 4,023,023 A | 5/1977 | Bourrez et al. | |
| 4,130,890 A | 12/1978 | Adam | |
| 4,392,758 A | 7/1983 | Bowles et al. | |
| 4,400,770 A | 8/1983 | Chan et al. | |
| 4,454,595 A | 6/1984 | Cage | |
| 4,471,426 A | 9/1984 | McDonough | |
| 4,477,872 A | 10/1984 | Losq et al. | |
| 4,514,807 A | 4/1985 | Nogi | |

(Continued)

FOREIGN PATENT DOCUMENTS

EP  0 130 381  1/1985

(Continued)

OTHER PUBLICATIONS

Farkas, K., et al., "The multicluster architecture: reducing cycle time through partitioning", *IEEE*, vol. 30, pp. 149-159, Dec. 1997 (XP010261292).

(Continued)

*Primary Examiner*—Meng-Ai An
*Assistant Examiner*—Eric C. Wai
(74) *Attorney, Agent, or Firm*—Fish & Richardson P.C.

(57) ABSTRACT

A system and method for employing registers for data transfer in multiple hardware contexts and programming engines to facilitate high performance data processing. The system and method includes a processor that includes programming engines with registers for transferring data from one of the registers residing in an executing programming engine to a subsequent one of the registers residing in an adjacent programming engine.

24 Claims, 6 Drawing Sheets

U.S. PATENT DOCUMENTS

| | | | |
|---|---|---|---|
| 4,523,272 A | 6/1985 | Fukunaga et al. | |
| 4,569,016 A | 2/1986 | Hao et al. | |
| 4,606,025 A | 8/1986 | Peters et al. | |
| 4,724,521 A | 2/1988 | Carron et al. | |
| 4,742,451 A | 5/1988 | Bruckert et al. | |
| 4,745,544 A | 5/1988 | Renner et al. | |
| 4,755,966 A | 7/1988 | Lee et al. | |
| 4,777,587 A | 10/1988 | Case et al. | |
| 4,808,988 A | 2/1989 | Burke et al. | |
| 4,816,913 A | 3/1989 | Harney et al. | |
| 4,847,755 A * | 7/1989 | Morrison et al. | 712/203 |
| 4,866,664 A | 9/1989 | Burkhardt, Jr. et al. | |
| 4,868,735 A | 9/1989 | Moller et al. | |
| 4,992,934 A | 2/1991 | Portanova et al. | |
| 5,045,995 A * | 9/1991 | Levinthal et al. | 712/236 |
| 5,056,015 A | 10/1991 | Baldwin et al. | |
| 5,073,864 A | 12/1991 | Methvin et al. | |
| 5,113,516 A | 5/1992 | Johnson | |
| 5,140,685 A | 8/1992 | Sipple et al. | |
| 5,142,683 A | 8/1992 | Burkhardt, Jr. et al. | |
| 5,155,831 A | 10/1992 | Emma et al. | |
| 5,155,854 A | 10/1992 | Flynn et al. | |
| 5,165,025 A | 11/1992 | Lass | |
| 5,168,555 A | 12/1992 | Byers et al. | |
| 5,170,484 A * | 12/1992 | Grondalski | 712/11 |
| 5,173,897 A | 12/1992 | Schrodi et al. | |
| 5,187,800 A * | 2/1993 | Sutherland | 712/18 |
| 5,189,636 A | 2/1993 | Patti et al. | |
| 5,202,972 A | 4/1993 | Gusefski et al. | |
| 5,220,669 A | 6/1993 | Baum et al. | |
| 5,247,671 A | 9/1993 | Adkins et al. | |
| 5,255,239 A | 10/1993 | Taborn et al. | |
| 5,263,169 A | 11/1993 | Genusov et al. | |
| 5,274,770 A | 12/1993 | Khim Yeoh et al. | |
| 5,347,648 A | 9/1994 | Stamm et al. | |
| 5,357,617 A * | 10/1994 | Davis et al. | 712/245 |
| 5,363,448 A | 11/1994 | Koopman, Jr. et al. | |
| 5,367,678 A | 11/1994 | Lee et al. | |
| 5,390,329 A | 2/1995 | Gaertner et al. | |
| 5,392,391 A | 2/1995 | Caulk, Jr. et al. | |
| 5,392,411 A | 2/1995 | Ozaki | |
| 5,392,412 A | 2/1995 | McKenna | |
| 5,394,530 A | 2/1995 | Kitta | |
| 5,404,464 A | 4/1995 | Bennett | |
| 5,404,482 A | 4/1995 | Stamm et al. | |
| 5,428,779 A | 6/1995 | Allegrucci et al. | |
| 5,428,809 A | 6/1995 | Coffin et al. | |
| 5,432,918 A | 7/1995 | Stamm | |
| 5,436,626 A | 7/1995 | Fujiwara et al. | |
| 5,442,756 A | 8/1995 | Grochowski et al. | |
| 5,448,702 A | 9/1995 | Garcia, Jr. et al. | |
| 5,450,351 A | 9/1995 | Heddes | |
| 5,450,603 A | 9/1995 | Davies | |
| 5,452,437 A | 9/1995 | Richey et al. | |
| 5,459,842 A | 10/1995 | Begun et al. | |
| 5,463,625 A | 10/1995 | Yasrebi | |
| 5,463,746 A | 10/1995 | Brodnax et al. | |
| 5,467,452 A | 11/1995 | Blum et al. | |
| 5,481,683 A | 1/1996 | Karim | |
| 5,487,159 A | 1/1996 | Byers et al. | |
| 5,509,130 A | 4/1996 | Trauben et al. | |
| 5,517,628 A | 5/1996 | Morrison et al. | |
| 5,517,648 A | 5/1996 | Bertone et al. | |
| 5,541,920 A | 7/1996 | Angle et al. | |
| 5,542,070 A | 7/1996 | LeBlanc et al. | |
| 5,542,088 A | 7/1996 | Jennings, Jr. et al. | |
| 5,544,236 A | 8/1996 | Andruska et al. | |
| 5,544,337 A | 8/1996 | Beard et al. | |
| 5,550,816 A | 8/1996 | Hardwick et al. | |
| 5,557,766 A | 9/1996 | Takiguchi et al. | |
| 5,568,617 A | 10/1996 | Kametani | |
| 5,572,690 A * | 11/1996 | Molnar et al. | 712/200 |
| 5,574,922 A | 11/1996 | James | |
| 5,574,939 A | 11/1996 | Keckler et al. | |
| 5,592,622 A | 1/1997 | Isfeld et al. | |
| 5,600,812 A | 2/1997 | Park | |
| 5,600,848 A * | 2/1997 | Sproull et al. | 712/42 |
| 5,606,676 A | 2/1997 | Grochowski et al. | |
| 5,610,864 A | 3/1997 | Manning | |
| 5,613,071 A | 3/1997 | Rankin et al. | |
| 5,613,136 A | 3/1997 | Casavant et al. | |
| 5,623,489 A | 4/1997 | Cotton et al. | |
| 5,627,829 A | 5/1997 | Gleeson et al. | |
| 5,630,130 A | 5/1997 | Perotto et al. | |
| 5,640,538 A | 6/1997 | Dyer et al. | |
| 5,644,623 A | 7/1997 | Gulledge | |
| 5,649,157 A | 7/1997 | Williams | |
| 5,652,583 A | 7/1997 | Kang | |
| 5,659,687 A | 8/1997 | Kim et al. | |
| 5,659,722 A | 8/1997 | Blaner et al. | |
| 5,669,012 A | 9/1997 | Shimizu et al. | |
| 5,680,564 A | 10/1997 | Divivier et al. | |
| 5,680,641 A | 10/1997 | Sidman | |
| 5,689,566 A | 11/1997 | Nguyen | |
| 5,692,167 A | 11/1997 | Grochowski et al. | |
| 5,699,537 A | 12/1997 | Sharangpani et al. | |
| 5,701,435 A | 12/1997 | Chi | |
| 5,704,054 A | 12/1997 | Bhattacharya | |
| 5,717,760 A | 2/1998 | Satterfield | |
| 5,717,898 A | 2/1998 | Kagan et al. | |
| 5,721,869 A | 2/1998 | Imakawa | |
| 5,721,870 A | 2/1998 | Matsumoto | |
| 5,724,563 A | 3/1998 | Hasegawa | |
| 5,742,587 A | 4/1998 | Zornig et al. | |
| 5,742,782 A | 4/1998 | Ito et al. | |
| 5,742,822 A | 4/1998 | Motomura | |
| 5,745,913 A | 4/1998 | Pattin et al. | |
| 5,748,950 A | 5/1998 | White et al. | |
| 5,751,987 A | 5/1998 | Mahant Shetti et al. | |
| 5,761,507 A | 6/1998 | Govett | |
| 5,761,522 A | 6/1998 | Hisanaga et al. | |
| 5,781,774 A | 7/1998 | Krick | |
| 5,784,649 A | 7/1998 | Begur et al. | |
| 5,784,712 A | 7/1998 | Byers et al. | |
| 5,787,454 A | 7/1998 | Rohlman | |
| 5,796,413 A | 8/1998 | Shipp et al. | |
| 5,797,043 A | 8/1998 | Lewis et al. | |
| 5,802,373 A | 9/1998 | Yates et al. | |
| 5,809,235 A | 9/1998 | Sharma et al. | |
| 5,809,530 A | 9/1998 | Samra et al. | |
| 5,812,811 A | 9/1998 | Dubey et al. | |
| 5,812,839 A | 9/1998 | Hoyt et al. | |
| 5,812,868 A | 9/1998 | Moyer et al. | |
| 5,815,698 A | 9/1998 | Holmann et al. | |
| 5,815,714 A | 9/1998 | Shridhar et al. | |
| 5,819,080 A | 10/1998 | Dutton et al. | |
| 5,822,619 A | 10/1998 | Sidwell | |
| 5,828,746 A | 10/1998 | Ardon | |
| 5,828,863 A | 10/1998 | Barrett et al. | |
| 5,832,215 A | 11/1998 | Kato et al. | |
| 5,832,258 A | 11/1998 | Kiuchi et al. | |
| 5,835,755 A | 11/1998 | Stellwagen, Jr. | |
| 5,838,975 A | 11/1998 | Abramson et al. | |
| 5,848,276 A * | 12/1998 | King et al. | 710/200 |
| 5,854,922 A | 12/1998 | Gravenstein et al. | |
| 5,857,104 A | 1/1999 | Natarjan et al. | |
| 5,859,789 A | 1/1999 | Sidwell | |
| 5,859,790 A | 1/1999 | Sidwell | |
| 5,860,085 A | 1/1999 | Stormon et al. | |
| 5,860,158 A | 1/1999 | Pai et al. | |
| 5,870,597 A | 2/1999 | Panwar et al. | |
| 5,872,963 A | 2/1999 | Bitar et al. | |
| 5,875,355 A | 2/1999 | Sidwell et al. | |
| 5,875,470 A | 2/1999 | Dreibelbis et al. | |

| | | | | | | |
|---|---|---|---|---|---|---|
| 5,884,069 A | 3/1999 | Sidwell | | 6,157,988 A | 12/2000 | Dowling |
| 5,886,992 A | 3/1999 | Raatikainen et al. | | 6,160,562 A | 12/2000 | Chin et al. |
| 5,887,134 A | 3/1999 | Ebrahim | | 6,182,177 B1 | 1/2001 | Harriman |
| 5,890,208 A | 3/1999 | Kwon | | 6,195,676 B1 | 2/2001 | Spix et al. |
| 5,892,979 A | 4/1999 | Shiraki et al. | | 6,195,739 B1 * | 2/2001 | Wright et al. ................. 712/19 |
| 5,898,866 A | 4/1999 | Atkins et al. | | 6,199,133 B1 | 3/2001 | Schnell |
| 5,900,025 A | 5/1999 | Sollars | | 6,201,807 B1 | 3/2001 | Prasanna |
| 5,905,876 A | 5/1999 | Pawlowski et al. | | 6,205,468 B1 | 3/2001 | Diepstraten et al. |
| 5,905,889 A | 5/1999 | Wilhelm, Jr. | | 6,212,542 B1 | 4/2001 | Kahle et al. |
| 5,915,123 A | 6/1999 | Mirsky et al. | | 6,212,611 B1 | 4/2001 | Nizar et al. |
| 5,923,872 A | 7/1999 | Chrysos et al. | | 6,216,220 B1 | 4/2001 | Hwang |
| 5,926,646 A | 7/1999 | Pickett et al. | | 6,223,207 B1 | 4/2001 | Lucovsky et al. |
| 5,928,358 A | 7/1999 | Takayama et al. | | 6,223,208 B1 | 4/2001 | Kiefer et al. |
| 5,933,627 A | 8/1999 | Parady | | 6,223,238 B1 | 4/2001 | Meyer et al. |
| 5,937,177 A * | 8/1999 | Molnar et al. ................. 712/200 | | 6,223,277 B1 | 4/2001 | Karguth |
| 5,937,187 A | 8/1999 | Kosche et al. | | 6,223,279 B1 | 4/2001 | Nishimura et al. |
| 5,938,736 A | 8/1999 | Muller et al. | | 6,230,119 B1 | 5/2001 | Mitchell |
| 5,940,612 A | 8/1999 | Brady et al. | | 6,230,230 B1 * | 5/2001 | Joy et al. ..................... 710/200 |
| 5,940,866 A | 8/1999 | Chisholm et al. | | 6,230,261 B1 | 5/2001 | Henry et al. |
| 5,943,491 A * | 8/1999 | Sutherland et al. ........... 713/375 | | 6,247,025 B1 | 6/2001 | Bacon |
| 5,944,816 A | 8/1999 | Dutton et al. | | 6,256,713 B1 | 7/2001 | Audityan et al. |
| 5,946,222 A | 8/1999 | Redford | | 6,259,699 B1 | 7/2001 | Opalka et al. |
| 5,946,487 A | 8/1999 | Dangelo | | 6,269,391 B1 | 7/2001 | Gillespie |
| 5,948,081 A | 9/1999 | Foster | | 6,272,616 B1 | 8/2001 | Fernando et al. |
| 5,951,679 A | 9/1999 | Anderson et al. | | 6,275,505 B1 | 8/2001 | O Loughlin et al. |
| 5,956,514 A | 9/1999 | Wen et al. | | 6,275,508 B1 | 8/2001 | Aggarwal et al. |
| 5,958,031 A | 9/1999 | Kim | | 6,279,066 B1 | 8/2001 | Velingker |
| 5,961,628 A | 10/1999 | Nguyen et al. | | 6,279,113 B1 | 8/2001 | Vaidya |
| 5,970,013 A | 10/1999 | Fischer et al. | | 6,289,011 B1 | 9/2001 | Seo et al. |
| 5,978,838 A | 11/1999 | Mohamed et al. | | 6,298,370 B1 | 10/2001 | Tang et al. |
| 5,983,274 A | 11/1999 | Hyder et al. | | 6,304,956 B1 | 10/2001 | Tran |
| 5,993,627 A | 11/1999 | Anderson et al. | | 6,307,789 B1 | 10/2001 | Wolrich et al. |
| 5,996,068 A | 11/1999 | Dwyer, III et al. | | 6,314,510 B1 | 11/2001 | Saulsbury et al. |
| 6,002,881 A | 12/1999 | York et al. | | 6,324,624 B1 | 11/2001 | Wolrich et al. |
| 6,005,575 A | 12/1999 | Colleran et al. | | 6,338,133 B1 | 1/2002 | Schroter |
| 6,009,505 A | 12/1999 | Thayer et al. | | 6,345,334 B1 | 2/2002 | Nakagawa et al. |
| 6,009,515 A | 12/1999 | Steele, Jr. | | 6,347,344 B1 | 2/2002 | Baker et al. |
| 6,012,151 A | 1/2000 | Mano | | 6,351,808 B1 | 2/2002 | Joy et al. |
| 6,014,729 A | 1/2000 | Lannan et al. | | 6,356,962 B1 | 3/2002 | Kasper |
| 6,023,742 A | 2/2000 | Ebeling et al. | | 6,360,262 B1 | 3/2002 | Guenthner et al. |
| 6,029,228 A | 2/2000 | Cai et al. | | 6,373,848 B1 | 4/2002 | Allison et al. |
| 6,052,769 A | 4/2000 | Huff et al. | | 6,378,124 B1 | 4/2002 | Bates et al. |
| 6,058,168 A | 5/2000 | Braband | | 6,378,125 B1 | 4/2002 | Bates et al. |
| 6,058,465 A | 5/2000 | Nguyen | | 6,385,720 B1 | 5/2002 | Tanaka et al. |
| 6,061,710 A | 5/2000 | Eickemeyer et al. | | 6,389,449 B1 | 5/2002 | Nemirovsky et al. |
| 6,061,711 A | 5/2000 | Song et al. | | 6,393,483 B1 | 5/2002 | Latif et al. |
| 6,067,585 A | 5/2000 | Hoang | | 6,401,155 B1 | 6/2002 | Saville et al. |
| 6,070,231 A | 5/2000 | Ottinger | | 6,408,325 B1 | 6/2002 | Shaylor |
| 6,072,781 A | 6/2000 | Feeney et al. | | 6,415,338 B1 | 7/2002 | Habot |
| 6,073,215 A | 6/2000 | Snyder | | 6,426,940 B1 | 7/2002 | Seo et al. |
| 6,076,158 A | 6/2000 | Sites et al. | | 6,427,196 B1 | 7/2002 | Adiletta et al. |
| 6,079,008 A | 6/2000 | Clery, III | | 6,430,626 B1 | 8/2002 | Witkowski et al. |
| 6,079,014 A | 6/2000 | Papworth et al. | | 6,434,145 B1 | 8/2002 | Opsasnick et al. |
| 6,085,215 A | 7/2000 | Ramakrishnan et al. | | 6,442,669 B2 * | 8/2002 | Wright et al. ................. 712/19 |
| 6,085,294 A | 7/2000 | Van Doren et al. | | 6,446,190 B1 | 9/2002 | Barry et al. |
| 6,092,127 A | 7/2000 | Tausheck | | 6,463,072 B1 | 10/2002 | Wolrich et al. |
| 6,092,158 A | 7/2000 | Harriman et al. | | 6,496,847 B1 | 12/2002 | Bugnion et al. |
| 6,092,175 A | 7/2000 | Levy et al. | | 6,505,229 B1 | 1/2003 | Turner et al. |
| 6,100,905 A | 8/2000 | Sidwell | | 6,523,108 B1 | 2/2003 | James et al. |
| 6,101,599 A * | 8/2000 | Wright et al. ................. 712/228 | | 6,532,509 B1 | 3/2003 | Wolrich et al. |
| 6,112,016 A | 8/2000 | MacWilliams et al. | | 6,543,049 B1 | 4/2003 | Bates et al. |
| 6,115,777 A | 9/2000 | Zahir et al. | | 6,552,826 B2 | 4/2003 | Adler et al. |
| 6,115,811 A | 9/2000 | Steele, Jr. | | 6,560,629 B1 | 5/2003 | Harris |
| 6,134,665 A | 10/2000 | Klein et al. | | 6,560,667 B1 | 5/2003 | Wolrich et al. |
| 6,139,199 A | 10/2000 | Rodriguez | | 6,560,671 B1 * | 5/2003 | Samra et al. ................. 711/108 |
| 6,141,348 A | 10/2000 | Muntz | | 6,564,316 B1 | 5/2003 | Perets et al. |
| 6,141,689 A | 10/2000 | Yasrebi | | 6,574,702 B2 * | 6/2003 | Khanna et al. ............... 711/108 |
| 6,141,765 A | 10/2000 | Sherman | | 6,577,542 B2 | 6/2003 | Wolrich et al. |
| 6,144,669 A | 11/2000 | Williams et al. | | 6,584,522 B1 | 6/2003 | Wolrich et al. |
| 6,145,054 A | 11/2000 | Mehrotra et al. | | 6,587,906 B2 | 7/2003 | Wolrich et al. |
| 6,145,077 A | 11/2000 | Sidwell et al. | | 6,606,704 B1 * | 8/2003 | Adiletta et al. ............... 712/248 |
| 6,145,123 A | 11/2000 | Torrey et al. | | 6,625,654 B1 | 9/2003 | Wolrich et al. |
| 6,157,955 A | 12/2000 | Narad et al. | | 6,629,237 B2 | 9/2003 | Wolrich et al. |

| | | | |
|---|---|---|---|
| 6,631,430 B1 | 10/2003 | Wolrich et al. | |
| 6,631,462 B1 | 10/2003 | Wolrich et al. | |
| 6,661,794 B1 | 12/2003 | Wolrich et al. | |
| 6,667,920 B2 | 12/2003 | Wolrich et al. | |
| 6,668,317 B1 | 12/2003 | Bernstein et al. | |
| 6,681,300 B2 | 1/2004 | Wolrich et al. | |
| 6,694,380 B1 | 2/2004 | Wolrich et al. | |
| 6,697,935 B1 | 2/2004 | Borkenhagen et al. | |
| 6,718,457 B2 * | 4/2004 | Tremblay et al. | 712/212 |
| 6,784,889 B1 | 8/2004 | Radke | |
| 6,836,838 B1 * | 12/2004 | Wright et al. | 712/19 |
| 6,862,676 B1 * | 3/2005 | Knapp et al. | 712/217 |
| 6,934,951 B2 * | 8/2005 | Wilkinson et al. | 718/107 |
| 6,971,103 B2 | 11/2005 | Hokenek et al. | |
| 6,976,095 B1 | 12/2005 | Wolrich et al. | |
| 6,983,350 B1 | 1/2006 | Adiletta et al. | |
| 7,020,871 B2 | 3/2006 | Bernstein et al. | |
| 7,181,594 B2 * | 2/2007 | Wilkinson et al. | 712/11 |
| 7,185,224 B1 * | 2/2007 | Fredenburg et al. | 714/10 |
| 7,191,309 B1 | 3/2007 | Wolrich et al. | |
| 7,302,549 B2 * | 11/2007 | Wilkinson et al. | 712/32 |
| 2002/0038403 A1 | 3/2002 | Wolrich et al. | |
| 2002/0053017 A1 | 5/2002 | Adiletta et al. | |
| 2002/0056037 A1 | 5/2002 | Wolrich et al. | |
| 2003/0041228 A1 | 2/2003 | Rosenbluth et al. | |
| 2003/0145159 A1 | 7/2003 | Adiletta et al. | |
| 2004/0039895 A1 | 2/2004 | Wolrich et al. | |
| 2004/0054880 A1 | 3/2004 | Bernstein et al. | |
| 2004/0071152 A1 | 4/2004 | Wolrich et al. | |
| 2004/0073728 A1 | 4/2004 | Wolrich et al. | |
| 2004/0073778 A1 | 4/2004 | Adiletta et al. | |
| 2004/0098496 A1 | 5/2004 | Wolrich et al. | |
| 2004/0109369 A1 | 6/2004 | Wolrich et al. | |
| 2004/0205747 A1 | 10/2004 | Bernstein et al. | |
| 2007/0234009 A1 | 10/2007 | Wolrich et al. | |

FOREIGN PATENT DOCUMENTS

| | | |
|---|---|---|
| EP | 0 379 709 | 8/1990 |
| EP | 0 463 855 | 1/1992 |
| EP | 0 464 715 | 1/1992 |
| EP | 0 476 628 | 3/1992 |
| EP | 0 633 678 | 1/1995 |
| EP | 0 696 772 | 2/1996 |
| EP | 0 745 933 | 12/1996 |
| EP | 0 809 180 | 11/1997 |
| EP | 0 863 462 | 9/1998 |
| JP | 59111533 | 6/1984 |
| WO | WO 94/15287 | 7/1994 |
| WO | WO 97/38372 | 10/1997 |
| WO | WO 01/15718 | 3/2001 |
| WO | WO 01/16697 | 3/2001 |
| WO | WO 01/16698 | 3/2001 |
| WO | WO 01/16702 | 3/2001 |
| WO | WO 01/16703 | 3/2001 |
| WO | WO 01/16713 | 3/2001 |
| WO | WO 01/16714 | 3/2001 |
| WO | WO 01/16715 | 3/2001 |
| WO | WO 01/16716 | 3/2001 |
| WO | WO 01/16718 | 3/2001 |
| WO | WO 01/16722 | 3/2001 |
| WO | WO 01/16758 | 3/2001 |
| WO | WO 01/16769 | 3/2001 |
| WO | WO 01/16770 | 3/2001 |
| WO | WO 01/16782 | 3/2001 |
| WO | WO 01/18646 | 3/2001 |
| WO | WO 01/41530 | 6/2001 |
| WO | WO 01/48596 | 7/2001 |
| WO | WO 01/48599 | 7/2001 |
| WO | WO 01/48606 | 7/2001 |
| WO | WO 01/48619 | 7/2001 |
| WO | WO 01/50247 | 7/2001 |
| WO | WO 01/50679 | 7/2001 |
| WO | WO03/019399 | 3/2003 |

OTHER PUBLICATIONS

Keckler, S., et al., "Exploiting fine-grain thread level parallelism on the MIT multi-ALU processor", *IEEE*, Jun. 1998 (XP010291366).
Agarwal et al., "April: A Processor Architecture for Multiprocessing," Proceedings of the 17th Annual International Symposium on Computer Architecture, IEEE, pp. 104-114.
Byrd et al., "Multithread Processor Architectures," *IEEE Spectrum*, vol. 32, No. 8, New York, Aug. 1, 1995, pp. 38-46.
Chang et al., "A New Mechanism For Improving Branch Predictor Performance," IEEE, pp. 22-31 (1994).
Doyle et al., *Microsoft Press Computer Dictionary*, 2 nd ed., Microsoft Press, Redmond, Washington, USA, 1994, p. 326.
Fillo et al., "The M-Machine Multicomputer," IEEE Proceedings of Micro-28, 1995, pp. 146-156.
Gomez et al., "Efficient Multithreaded User-Space Transport for Network Computing: Design and Test of the Trap Protocol," *Journal of Parallel and Distributed Computing*, Academic Press, Duluth, Minnesota, USA, vol. 40, No. 1, Jan. 10, 1997, pp. 103-117.
Haug et al., "Reconfigurable hardware as shared resource for parallel threads," IEEE Symposium on FPGAs for Custom Computing Machines, 1998.
Hauser et al., "Garp: a MIPS processor with a reconfigurable coprocessor," Proceedings of the 5th Annual IEEE Symposium on Field-Programmable Custom Computing Machines, 1997.
Hennessy et al., "Computer Organization and Design: The Hardware/Software Interface," Morgan Kaufman Publishers, 1998, pp. 476-482.
Hyde, R., "Overview of Memory Management," *Byte*, vol. 13, No. 4, 1998, pp. 219-225.
Intel, "IA-64 Application Developer's Architecture Guide," Rev.1.0, May 1999, pp. 2-2, 4-29 to 4-31, 7-116 to 7-118 and c-21.
Litch et al., "StrongARMing Portable Communications," IEEE Micro, 1998, pp. 48-55.
Mendelson et al., "Design Alternatives of Multithreaded Architecture," *International Journal of Parallel Programming*, vol. 27, No. 3,Plenum Press, New York, USA, Jun. 1999, pp. 161-193.
Schmidt et al., "The Performance of Alternative Threading Architectures for Parallel Communication Subsystems," Internet Document, *Online!*, Nov. 13, 1998.
Thistle et al., "A Processor Architecture for Horizon," IEEE, 1998, pp. 35-41.
Tremblay et al., "A Three Dimensional Register File for Superscalar Processors," IEEE Proceedings of the 28th Annual Hawaii International Conference on System Sciences, 1995, pp. 191-201.
Trimberger et al, "A time-multiplexed FPGA," Proceedings of the 5th Annual IEEE Symposium on Field-Programmable Custom Computing Machines, 1998.
Turner et al., "Design of High Performance Active Router," Internet Document, *Online*, Mar. 18, 1999.
Vibhatavanijt et al., "Simultaneous Multithreading-Based Routers," Proceedings of the 2000 International Conference of Parallel Processing, Toronto, Ontario, Canada, Aug. 21-24, 2000, pp. 362-359.
Walder, "The Concatenate Vanishes," University of Glasgow, Dec. 1987 (revised Nov. 1989), pp. 1-7.
Wazlowski et al., "PRSIM-II computer and architecture," IEEE Proceedings, Workshop on FPGAs for Custom Computing Machines, 1993.
"Hart, Field Communications Protocol, Application Guide", Hart Communication Foundation, pp. 1-74, (1999).
Bowden, Romilly, "What is Hart?" Romilly's Hart® and Fieldbus Web Site, 3 pages, (1997). <URL: http://www.romilly.co.uk/whathart.htm>.
Cheng, et al., "The Compiler for Supporting Multithreading in Cyclic Register Windows", *IEEE*, pp. 57-62, (1996).
Hennessy et al., *Computer Organization and Design: The Hardware/Software Interface*, Morgan Kaufman Publishers, pp. 116-119, 181-182, 225-227, 447-449, 466-470, 476-482, 510-519, 712, (1998).
Heuring et al., *Computer Systems Design and Architecture*, Reading, MA, Addison Wesley Longman, Inc., pp. 174-176 and 200, (1997).

Heuring et al., *Computer Systems Design and Architecture*, Reading, MA, Addison Wesley Longman, Inc., pp. 38-40, 143-171, and 285-288, (1997).

Hidaka, Y., et al., "Multiple Threads in Cyclic Register Windows", *Computer Architecure News* ACM, New York, NY, USA, 21(2):131-142, May 1993.

Hirata, H., et al., "An Elementary Processor Architecture with Simultaneous Instruction Issuing from Multiple Threads", *Proc. 19th Annual International Symposium on Computer Architecture, ACM & IEEE-CS*, 20(2):136-145, May 1992.

Intel, "1 A-64 Application Developer's Architecture Guide," Rev.1.0, pp. 2-2, 2-3, 3-1, 7-165, C-4, and C-23, May 1999.

Jung, G., et al., "Flexible Register Window Structure for Multi-Tasking", *Proc. 24th Annual Hawaii International Conference on System Sciences*, vol. 1, pp. 110-116, (1991).

Koch, G., et al., "Breakpoints and Breakpoint Detection in Source Level Emulation", *Proc. 19th International Symposium on System Synthesis (ISSS '96), IEEE*, pp. 26-31 (1996).

Moors, et al., "Cascading Content-Addressable Memories", *IEEE Micro*, 12(3):56-66 (1992).

Okamoto, K., et al., "Multithread Execution Mechanisms on RICA-1 for Massively Parallel Computation", *IEEE—Proc. Of Pact '96*, pp. 116-121 (1996).

Patterson, et al., *Computer Architecture A Quantitiative Approach*, 2nd Ed., Morgan Kaufmann Publishers, Inc., pp. 447-449, (1996).

Paver, et al., "Register Locking in an Asynchronous Microprocessor", *IEEE*, pp. 351-355, (1992).

Philips ED—Philips Components: "8051 Based 8 Bit Microcontrollers, Data Handbook Integrated Circuits, Book IC20", 8051 Based 8 Bit Microcontrollers, Endhoven, Philips, NL, pp. 5-19 (1991).

Probst et al., "Programming, Compiling and Executing Partially-Ordered Instruction Streams on Scalable Shared-Memory Multiprocessors", *Proceedings of the $27^{th}$ Annual Hawaiian International Conference on System Science, IEEE*, pp. 584-593, (1994).

Quammen, D., et al., "Flexible Register Management for Sequential Programs", *IEEE Proc. of the Annual International Symposium on Computer Architecture*, Toronto, May 27-30, 1991, vol. SYMP. 18, pp. 320-329.

Ramsey, N., "Correctness of Trap-Based Breakpoint Implementations", *Proc. of the 21st ACM Symposium on the Principles of Programming Languages*, pp. 15-24 (1994).

Steven, G.B., et al., "ALU design and processor branch architecture", *Microprocessing and Microprogramming*, 36(5):259-278, Oct. 1993.

Young, H.C., "Code Scheduling Methods for Some Architectural Features in Pipe", *Microprocessing and Microprogramming*, Elsevier Science Publishers, Amsterdam, NL, 22(1):39-63, Jan. 1988.

Young, H.C., "On Instruction and Data Prefetch Mechanisms", *International Symposium on VLSI Technology, Systems and Applications, Proc. of Technical Papers*, pp. 239-246, (1995).

Heuring et al., *Computer Systems Design and Architecture*, Readings, MA, Addison Wesley Longman, Inc., pp. 69-71, (1997).

Kane, Gerry, PA-RISC 2.0 Architecture, 1995, Prentice Hall PTR, pp. 1-6, 7-13 & 7-14.

"IOP Task Switching", *IBM Technical Disclosure Bulletin*, 33(5):156-158, Oct. 1990.

U.S. Appl. No. 09/473,571, filed Dec. 28, 1999, Wolrich et al.

U.S. Appl. No. 09/475,614, filed Dec. 30, 1999, Wolrich et al.

Paver et al., "Register Locking in Asynchronous Processor Computer Design: VLSI Processors," ICCD '92 Proceedings, IEEE 1992 International Conference, 1992, pp. 351-355.

Waldspurger et al., "Register Relocation Flexible Contents for Multithreading," Proceedings of the 20th Annual International Symposium on Computer Architecture, 1993, pp. 120-130.

* cited by examiner

REGISTERS FOR DATA TRANSFERS

CROSS-REFERENCE TO RELATED APPLICATIONS

This application is related to U.S. application Ser. Nos. 09/747,019, filed on Dec. 21, 2000, 09/760,509, filed on Jan. 12, 2001, 09/811,995, filed on Mar. 19, 2001, 10/070,006 filed on Feb. 28, 2002, 10/070,091, filed on Jun. 28, 2002, 10/070,092, filed on Jun. 28, 2002, 10/069,306, filed on Jul. 3, 2002, 10/070,008, filed on Jul. 3, 2002, 10/070,011, filed on Jul. 3, 2002, 10/070,035, filed on Jul. 3, 2002, 10/212,945, filed Aug. 5, 2002, 10/069,352, filed on Aug. 7, 2002, 10/069,195, filed on Nov. 7, 2002, 10/069,805, filed on Nov. 7, 2002, and 10/069,229, filed on Dec. 11, 2002.

BACKGROUND

Parallel processing is an efficient form of information processing of concurrent events in a computing process. Parallel processing demands concurrent execution of many programs, in contrast to sequential processing. In the context of parallel processing, parallelism involves doing more than one thing at the same time. Unlike a serial paradigm where all tasks are performed sequentially at a single station or a pipelined machine where tasks are performed at specialized stations, with parallel processing, many stations are provided, each capable of performing and carrying out various tasks and functions simultaneously. A number of stations work simultaneously and independently on the same or common elements of a computing task. Accordingly, parallel processing solves various types of computing tasks and certain problems are suitable for solution by applying several instruction processing units and several data streams.

DESCRIPTION

Figure 1:
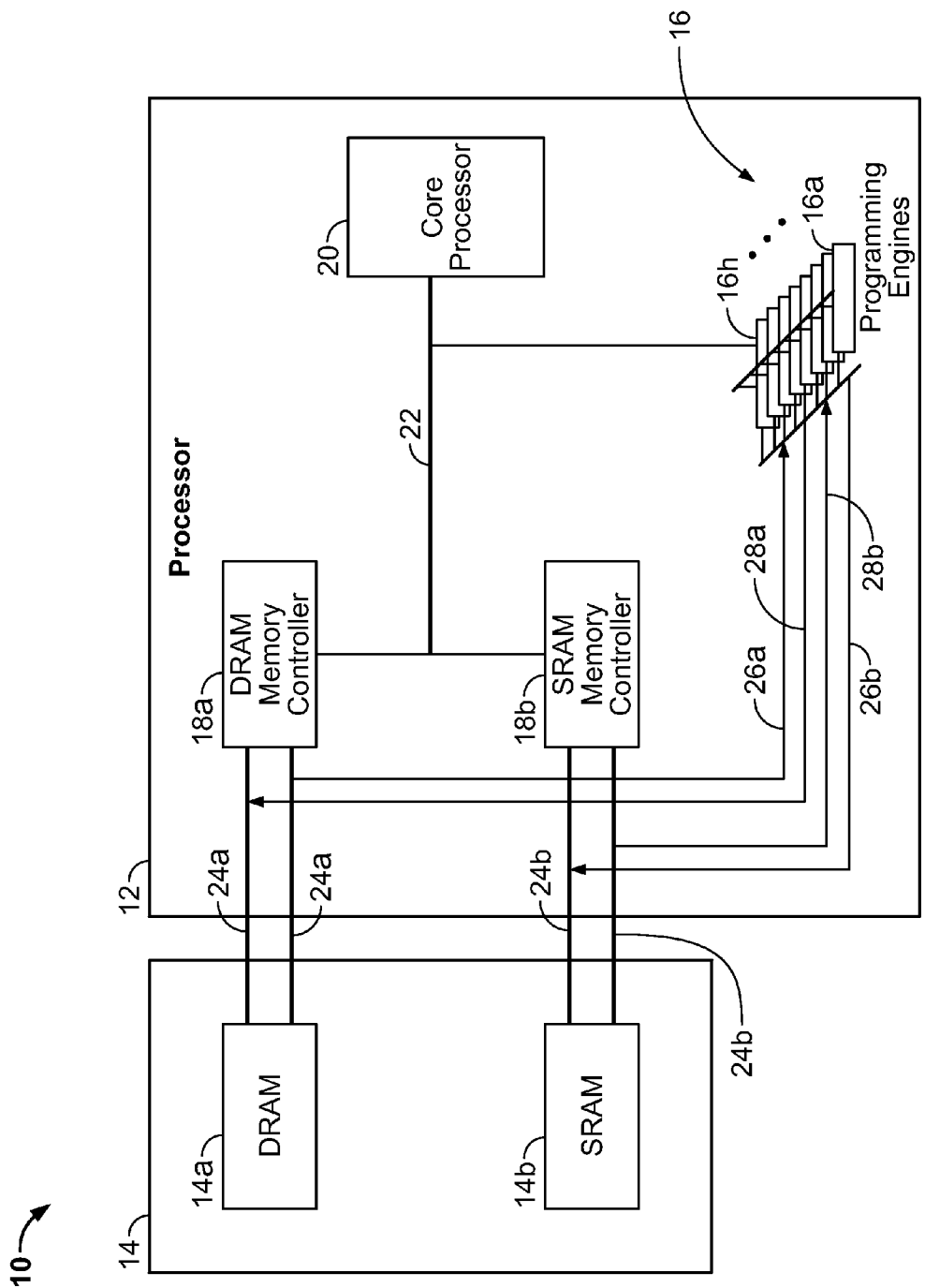
FIG. 1 is a block diagram of a processing system.

Architecture:

Referring to FIG. 1, a computer processing system 10 includes a parallel, hardware-based multithreaded network processor 12. The hardware-based multithreaded processor 12 is coupled to a memory system or memory resource 14. Memory system 14 includes dynamic random access memory (DRAM) 14a and static random access memory 14b (SRAM). The processing system 10 is especially useful for tasks that can be broken into parallel subtasks or functions. Specifically, the hardware-based multithreaded processor 12 is useful for tasks that are bandwidth oriented rather than latency oriented. The hardware-based multithreaded processor 12 has multiple functional microengines or programming engines 16a-16h (collectively, programming engines 16) each with multiple hardware controlled threads that are simultaneously active and independently work on a specific task.

The programming engines 16 each maintain program counters in hardware and states associated with the program counters. Effectively, corresponding sets of context or threads can be simultaneously active on each of the programming engines 16 while only one is actually operating at any one time.

In this example, eight programming engines 16a-16h are illustrated in FIG. 1. Each programming engine 16a-16h processes eight hardware threads or contexts. The eight programming engines 16a-16h operate with shared resources including memory resource 14 and bus interfaces (not shown). The hardware-based multithreaded processor 12 includes a dynamic random access memory (DRAM) controller 18a and a static random access memory (SRAM) controller 18b. The DRAM memory 14a and DRAM controller 18a are typically used for processing large volumes of data, e.g., processing of network payloads from network packets. The SRAM memory 14b and SRAM controller 18b are used in a networking implementation for low latency, fast access tasks, e.g., accessing look-up tables, memory for the core processor 20, and the like.

The eight programming engines 16a-16h access either the DRAM memory 14a or SRAM memory 14b based on characteristics of the data. Thus, low latency, low bandwidth data are stored in and fetched from SRAM memory 14b, whereas higher bandwidth data for which latency is not as important, are stored in and fetched from DRAM memory 14a. The programming engines 16 can execute memory reference instructions to either the DRAM controller 18a or SRAM controller 18b.

The hardware-based multithreaded processor 12 also includes a processor core 20 for loading microcode control for the programming engines 16. In this example, although other types of processor cores may be used in embodiments of this invention, the processor core 20 is an XScale™ based architecture, designed by Intel® Corporation, of Santa Clara, Calif.

The processor core 20 performs general-purpose computer type functions such as handling protocols, exceptions, and extra support for packet processing where the programming engines 16 pass the packets off for more detailed processing such as in boundary conditions.

The processor core 20 executes an operating system (not shown). Through the operating system (OS), the processor core 20 can call functions to operate on the programming engines 16a-16h. For the core processor 20 implemented as an XScale™ architecture, operating systems such as Microsoft® NT real-time of Microsoft® Corporation, of Seattle, Wash., VxWorks® real-time operating system of WindRiver®, of Alameda, Calif., or a freeware OS available over the Internet can be used.

Advantages of hardware multithreading can be explained by SRAM or DRAM memory accesses. As an example, an SRAM access requested by a context (e.g., Thread_0), from one of the programming engines 16, e.g., programming engine 16a, will cause the SRAM controller 18b to initiate an access to the SRAM memory 14b. The SRAM controller 18b accesses the SRAM memory 14b, fetches the data from the SRAM memory 14b, and returns data to a requesting programming engine 16.

During an SRAM access, if one of the programming engines 16a-16h has a single thread that could operate, that programming engine would be dormant until data was returned from the SRAM memory 14b.

By employing hardware context swapping within each of the programming engines 16a-16h, the hardware context swapping enables other contexts with unique program counters to execute in that same programming engine. Thus, another thread e.g., Thread_1 can function while the first thread, Thread_0, is awaiting the read data to return. During execution, Thread_1 may access the DRAM memory 14a. While Thread_1 operates on the DRAM unit, and Thread_0 is operating on the SRAM unit, a new thread, e.g., Thread_2 can now operate in the programming engine 16. Thread_2 can operate for a certain amount of time until it needs to access memory or perform some other long latency operation, such as making an access to a bus interface. Therefore, simultaneously, the multi-threaded processor 12 can have a bus operation, an SRAM operation, and a DRAM operation all being completed or operated upon by one of the programming engines 16 and have one more threads or contexts available to process more work.

The hardware context swapping also synchronizes the completion of tasks. For example, two threads can access the shared memory resource, e.g., the SRAM memory 14b. Each one of the separate functional units, e.g., the SRAM controller 18b, and the DRAM controller 18a, when they complete a requested task from one of the programming engine threads or contexts reports back a flag signaling completion of an operation. When the programming engines 16a-16h receive the flag, the programming engines 16a-16h can determine which thread to turn on.

One example of an application for the hardware-based multithreaded processor 12 is as a network processor. As a network processor, the hardware-based multithreaded processor 12 interfaces to network devices such as a Media Access Controller (MAC) device, e.g., a 10/100 BaseT Octal MAC or a Gigabit Ethernet device compliant with IEEE 802.3. In general, as a network processor, the hardware-based multithreaded processor 12 can interface to any type of communication device or interface that receives or sends large amount of data. The computer processing system 10 functioning in a networking application can receive network packets and process those packets in a parallel manner.

Figure 2:
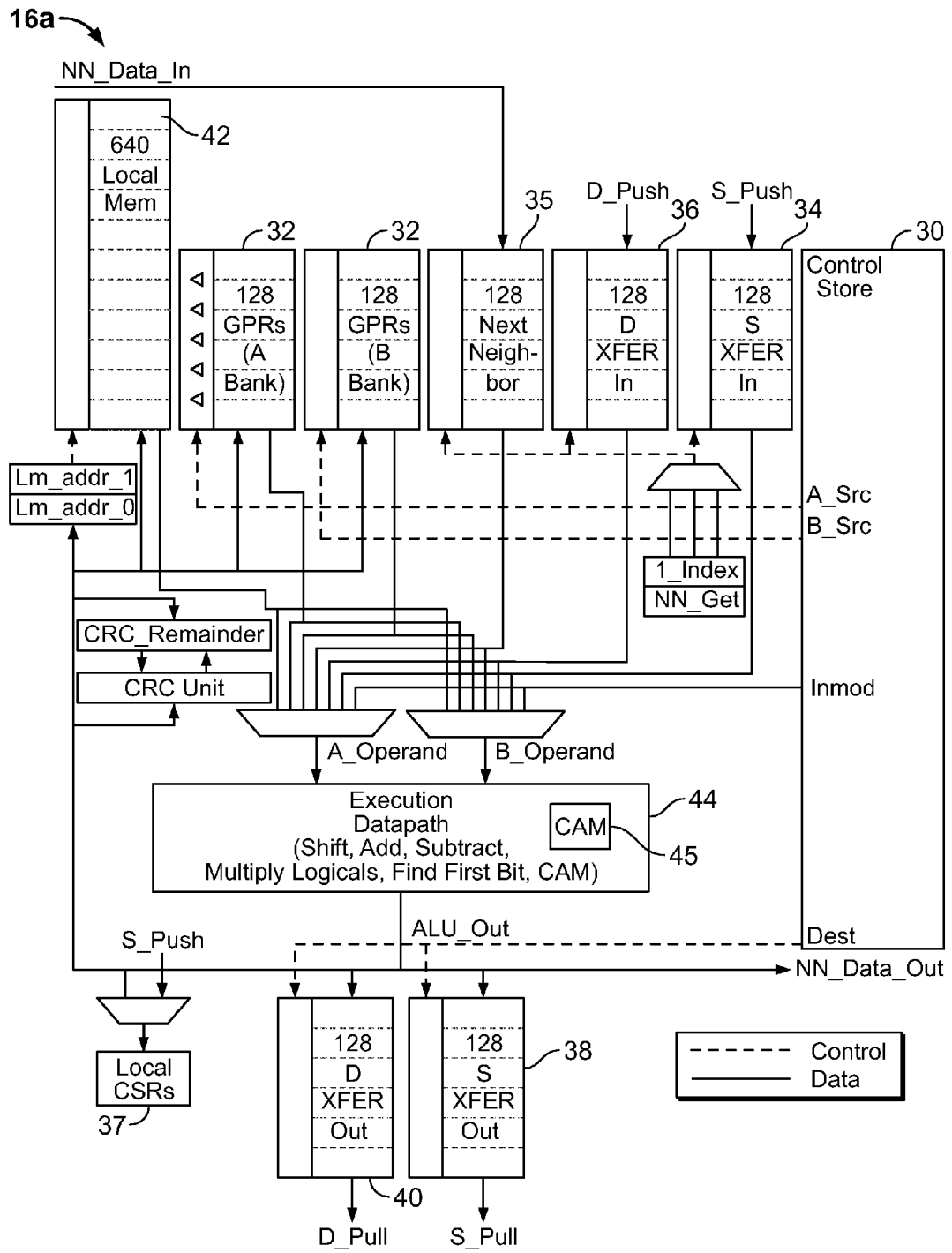
FIG. 2 is a detailed block diagram of the processing system of FIG. 1 where one of the embodiments of the invention may be advantageously practiced.

Registers in Programming Engines:

Referring to FIG. 2, one exemplary programming engine 16a from the programming engines 16, is shown. The programming engine 16a includes a control store 30, which in one example includes a RAM of 4096 instructions, each of which is 40-bits wide. The RAM stores a microprogram that the programming engine 16a executes. The microprogram in the control store 30 is loadable by the processor core 20 (FIG. 1).

In addition to event signals that are local to an executing thread, the programming engine 16a employs signaling states that are global. With signaling states, an executing thread can broadcast a signal state to all programming engines 16a-16h. Any and all threads in the programming engines can branch on these signaling states.

As described above, the programming engine 16a supports multi-threaded execution of eight contexts. This allows one thread to start executing just after another thread issues a memory reference and must wait until that reference completes before doing more work. Multi-threaded execution is critical to maintaining efficient hardware execution of the programming engine 16a because memory latency is significant. Multi-threaded execution allows the programming engines 16 to hide memory latency by performing useful independent work across several threads.

The programming engine 16a, to allow for efficient context swapping, has its own register set, program counter, and context specific local registers. Having a copy per context eliminates the need to move context specific information to and from shared memory and programming engine registers for each context swap. Fast context swapping allows a context to perform computations while other contexts wait for input-output (I/O), typically, external memory accesses to complete or for a signal from another context or hardware unit.

General Purpose Registers

The programming engine 16a executes the eight contexts by maintaining eight program counters and eight context relative sets of registers. A number of different types of context relative registers, such as general purpose registers (GPRs) 32, inter-programming agent registers (not shown), Static Random Access Memory (SRAM) input transfer registers 34, Dynamic Random Access Memory (DRAM) input transfer registers 36, SRAM output transfer registers 38, DRAM output transfer registers 40.

The GPRs 32 are used for general programming purposes. The GPRs 32 are read and written exclusively under program control. The GPRs 32, when used as a source in an instruction, supply operands to an execution datapath 44.

The execution datapath 44 can take one or two operands, perform an operation, and optionally write back a result. The execution datapath 44 includes a content addressable memory (CAM) 45. Each entry of the CAM 45 stores a 32-bit value, which can be compared against a source operand. All entries are compared in parallel and the result of the lookup is a 6-bit value.

When used as a destination in an instruction, the GPRs 32 are written with the result of the execution datapath 44. The programming engine 16a also includes I/O transfer registers 34, 36, 38 and 40 which are used for transferring data to and from the programming engine 16a and locations external to the programming engines 16a, e.g., the DRAM memory 14a, the SRAM memory 14b, and the like.

Transfer Registers

The programming engine 16a also includes transfer registers 34, 36, 38 and 40. Transfer registers 34, 36, 38 and 40 are used for transferring data to and from the programming engine 16a and locations external to the programming engine, e.g., DRAMs, SRAMs etc. There are four types of transfer registers as illustrated in FIG. 2, namely, input transfer registers and output transfer registers.

The input transfer registers, when used as a source in an instruction, supply operands to the execution datapath 44, whereas output transfer registers are written with the result from the execution datapath 44 when utilized as a destination in an instruction.

Local Control and Status Registers (CSRs)

Local control and status registers (CSRs) 37 are external to the execution datapath 44 and hold specific purpose information. They can be read and written by special instructions (local_csr_rd and local_csr_wr) and are typically accessed less frequently than datapath registers.

Next Neighbor Registers

The programming engine 16a also includes one hundred and twenty eight (128) Next Neighbor (NN) registers, collectively referred to as NN registers 35. Each NN Register 35, when used as a source in an instruction, also supplies operands to the execution datapath 44. Each NN register 35 is written either by an external entity, not limited to, an adjacent programming engine, or by the same programming engine 16a where each NN register 35 resides. The specific register is selected by a context-relative operation where the register number is encoded in the instruction, or as a ring operation, selected via, e.g., NN_Put (NN write address) and NN_Get (NN read address) in the CSR Registers.

NN_Put registers are used when the previous neighboring programming engine executes an instruction with NN_Put as a destination. The NN register selected by the value in this register is written, and the value in NN_Put is then incremented (a value of 127 wraps back to 0). The value in this register is compared to the value in NN_Get register to determine when to assert NN_Full and NN_Empty status signals.

NN_Get registers are used when the NN register 35 is accessed as a source, which is specified in the source field of the instruction. The NN register selected by the value in this register is read, and the value in NN_Put is then decremented (a value of 127 wraps back to 0). The value in this register is compared to the value in the NN_Put register to determine when to assert NN_Full and NN_Empty status signals.

Specifically, when each NN register 35 is used as an origin in an instruction, the instruction result data are sent out of the programming engine 16a, typically to another, adjacent programming engine. On the other hand, when the NN register 35 is used as a destination in an instruction, the instruction result data are written to the selected NN Register 35 in the programming engine 16a. The data are not sent out of the programming engine 16a as it would be when each NN register 35 is used as a destination. Each NN register 35 is used in a context pipelining method, as described below.

A local memory 42 is also used. The local memory 42 includes addressable storage located in the programming engine 16a. The local memory 42 is read and written exclusively under program control. The local memory 42 also includes variables shared by all the programming engines 16. Shared variables are modified in various assigned tasks during functional pipeline stages by the programming engines 16a-16h, which are described next. The shared variables include a critical section, defining the read-modify-write times. The implementation and use of the critical section in the computing processing system 10 is also described below.

Functional Pipelining and Pipeline Stages

Figure 3:
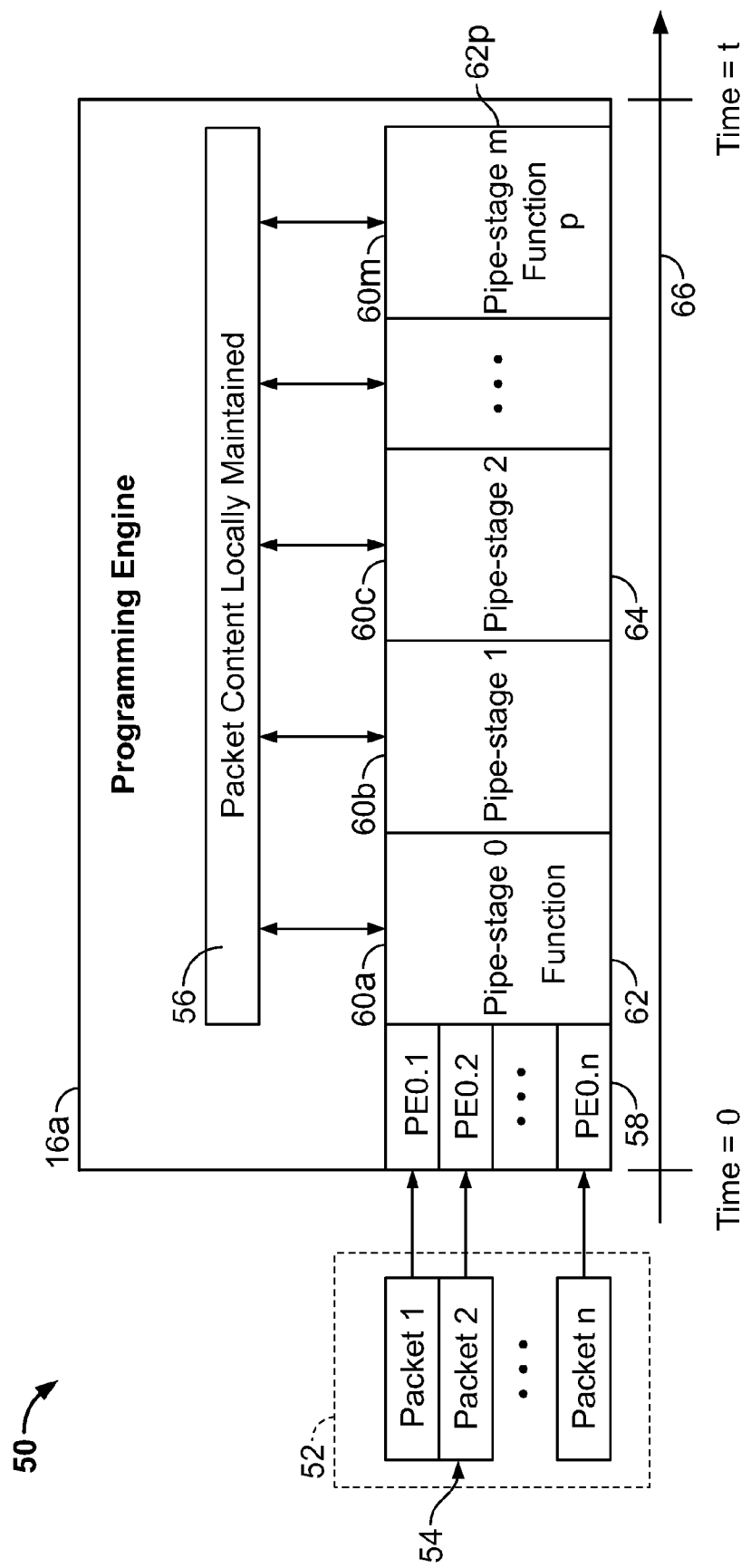
FIG. 3 is a block diagram of a functional pipeline unit of the processing system of FIG. 1.

Referring to FIG. 3, the programming engine 16a is shown in a functional pipeline unit 50. The functional pipeline unit 50 includes the programming engine 16a and a data unit 52 that includes data, operated on by the programming engine, e.g., network packets 54. The programming engine 16a is shown having a local register unit 56. The local register unit 56 stores information from the data packets 54.

In the functional pipeline unit 50, the contexts 58 of the programming engines 16a, namely, Programming Engine0.1 (PE0.1) through Programming Engine0.n (PE0.n), remain with the programming engine 16a while different functions are performed on the data packets 54 as time 66 progresses from time=0 to time=t. A programming execution time is divided into "m" functional pipeline stages or pipe-stages 60a-60m. Each pipeline stage of the pipeline stages 60a-60m performs different pipeline functions 62a, 64, or 62p on data in the pipeline.

The pipeline stage 60a is, for example, a regular time interval within which a particular processing function, e.g., the function 62a is applied to one of the data packets 54. A processing function 62 can last one or more pipelines stages 60. The function 64, for example, lasts two pipeline stages, namely pipeline stages 60b and 60c.

A single programming engine such as the programming engine 16a can constitute a functional pipeline unit 50. In the functional pipeline unit 50, the functions 62a, 64, and 62p move through the functional pipeline unit 50 from one programming engine (e.g., programming engine 16a), to another programming engine (e.g., programming engine 16b), as will be described next.

Figure 4:
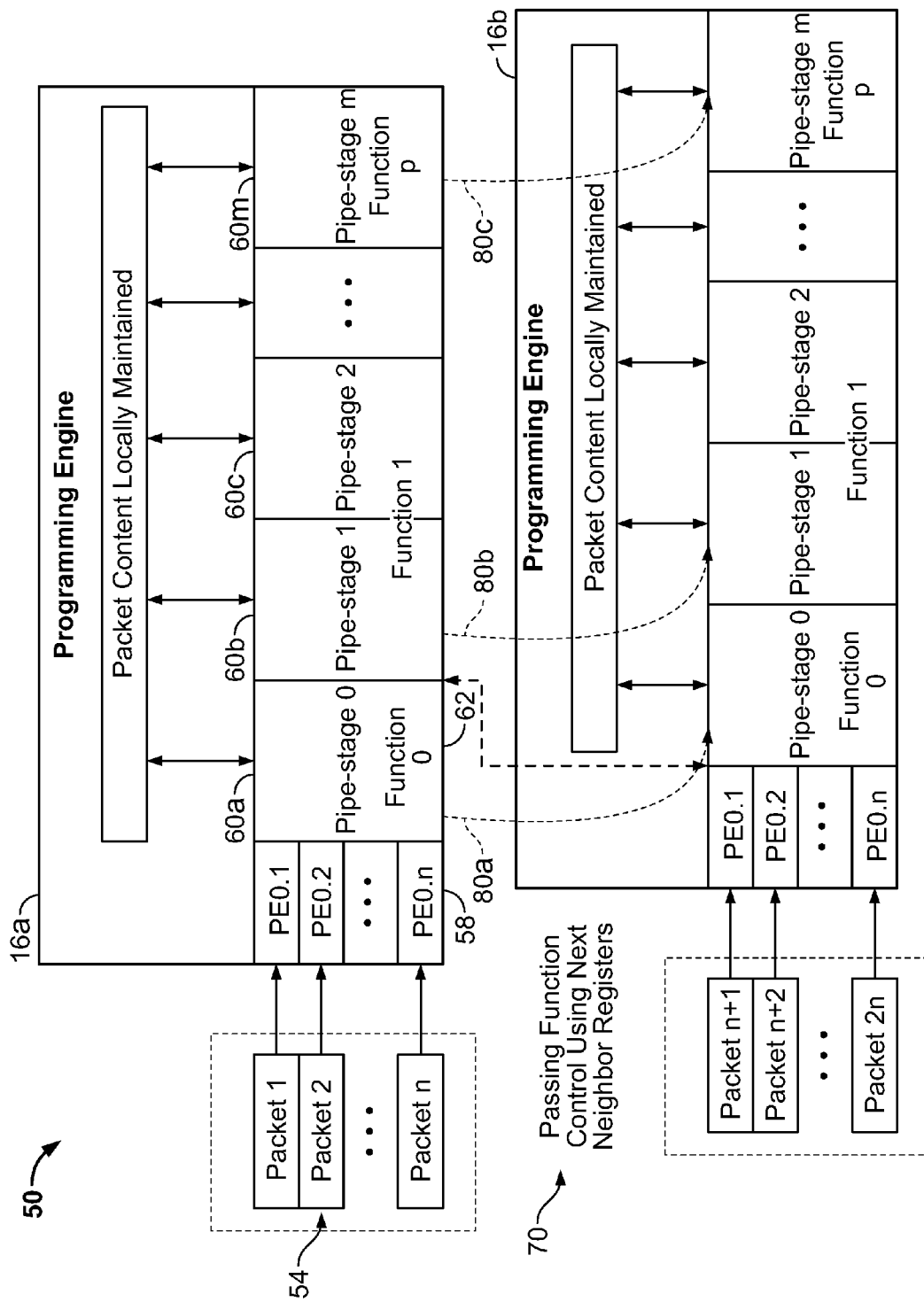
FIG. 4 is a block diagram illustrating details of the processing system of FIG. 1 where one of the embodiments of the invention may be advantageously practiced.

Referring to FIG. 4, the data packets 54 are assigned to programming engine contexts 58 in order. Thus, if "n" threads or contexts 58 execute in the programming engine 16a, the first context 58, "PE0.1" completes processing of the data packet 54 before the data packets 54 from the "PE0.n" context arrives. With this approach the programming engine 16b can begin processing the "n+1" packet.

Dividing the execution time of the programming engine 16a, for example, into functional pipeline stages 60a-60c results in more than one of the programming engines 16 executing an equivalent functional pipeline unit 70 in parallel. The functional pipeline stage 60a is distributed across two programming engines 16a and 16b, with each of the programming engines 16a and 16b executing eight contexts each.

In operation, each of the data packets 54 remains with one of the contexts 58 for a longer period of time as more programming engines 16 are added to the functional pipeline units 50 and 70. In this example, the data packet 54 remains with a context sixteen data packet arrival times (8 contexts×2 programming engines) because context PE0.1 is not required to accept another data packet 58 until the other contexts 58 have received their data packets.

In this example, function 62a of the functional pipeline stage 60a can be passed from the programming engine 16a to the programming engine 16b. Passing of the function 62a is accomplished by using Next Neighbor registers, as illustrated by dotted lines 80a-80c in FIG. 4.

The number of functional pipeline stages 60a-60m is equal to the number of the programming engines 16a and 16b in the functional pipeline units 50 and 70. This ensures that a particular pipeline stage executes in only one programming engine 16 at any one time.

Context Pipelining:

Each of the programming engine 16 supports multi-threaded execution of eight contexts. One reason for this is to allow one thread to start executing just after another thread issues a memory reference and must wait until that reference completes before doing more work. This behavior is critical to maintaining efficient hardware execution of the programming engines 16a-16f because memory latency is significant. Stated differently, if only a single thread execution was supported, the programming engine would sit idle for a significant number of cycles waiting for references to complete and thereby reduce overall computational throughput. Multi-threaded execution allows a programming engine to hide memory latency by performing useful independent work across several threads.

The programming engines 16a-16h (FIG. 1) each have eight available contexts. To allow for efficient context swapping, each of the eight contexts in the programming engine has its own register set, program counter, and context specific local registers. Having a copy per context eliminates the need to move context specific information to/from shared memory and programming engine registers for each context swap. Fast context swapping allows a context to do computation while other contexts wait for I/O, typically external memory accesses, to complete or for a signal from another context or hardware unit.

Figure 5:
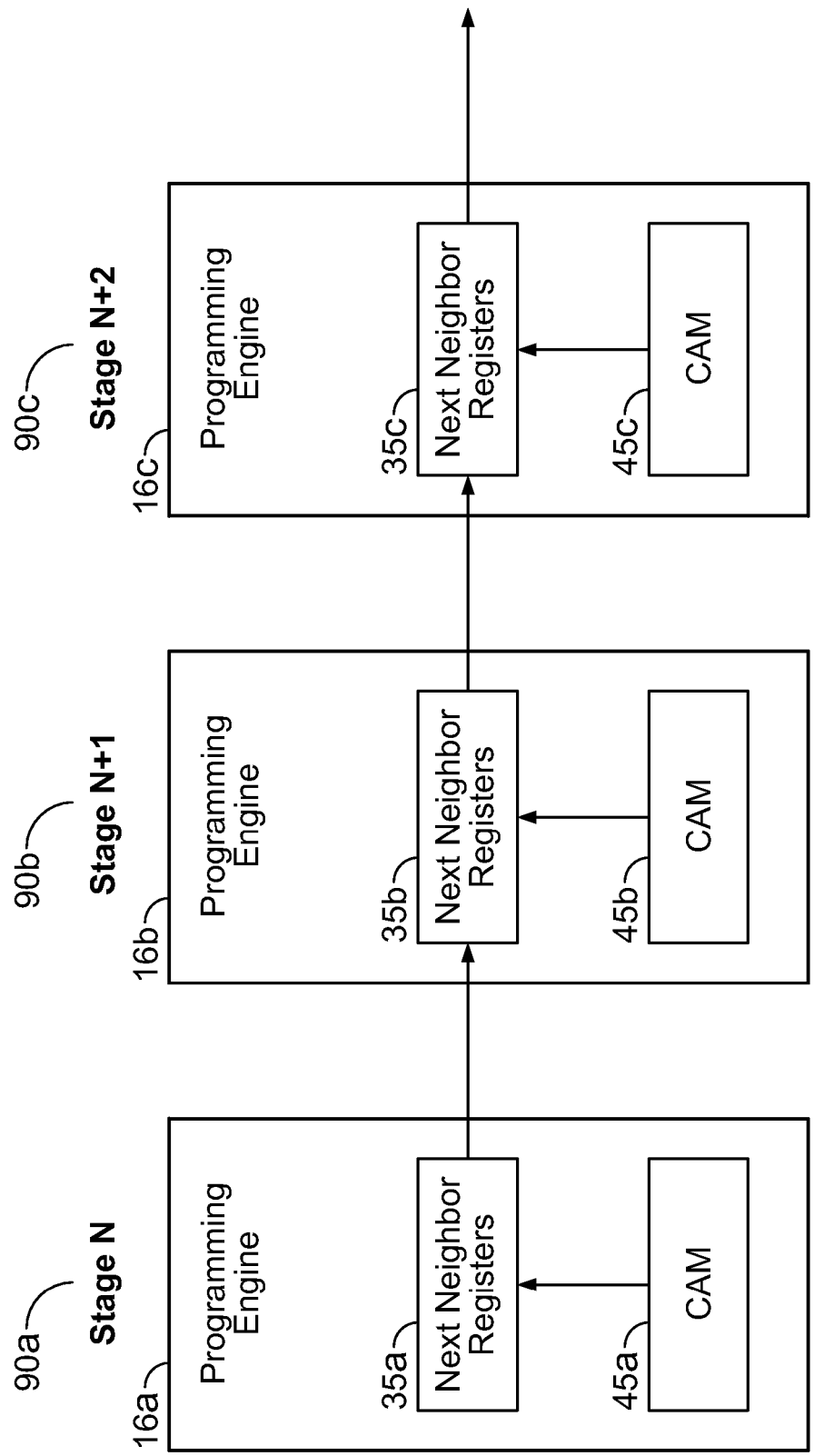
FIG. 5 is a simplified block diagram of a context pipeline process.

Referring now to FIG. 5, the context for a specific assigned task is maintained on the programming engines 16a-16c using CAM 45a-45c. The packets are processed in a pipelined fashion similar to an assembly line using NN registers 35a-

35c to pass data from one programming engine to a subsequent, adjacent programming engine. Data are passed from one stage 90a to a subsequent stage 90b and then from stage 90b to stage 90c of the pipeline, and so forth. In other words, data are passed to the next stage of the pipeline allowing the steps in the processor cycle to overlap. In particular, while one instruction is being executed, the next instruction can be fetched, which means that more than one instruction can be in the "pipe" at any one time, each at a different stage of being processed.

For example, data can be passed forward from one programming engine 16 to the next programming engine 16 in the pipeline using the NN registers 35a-35c, as illustrated by example in FIG. 5. This method of implementing pipelined processing has the advantage that the information included in CAM 45a-45c for each stage 90a-c is consistently valid for all eight contexts of the pipeline stage. The context pipeline method may be utilized when minimal data from the packet being processed must advance through the context pipeline.

Figure 6:
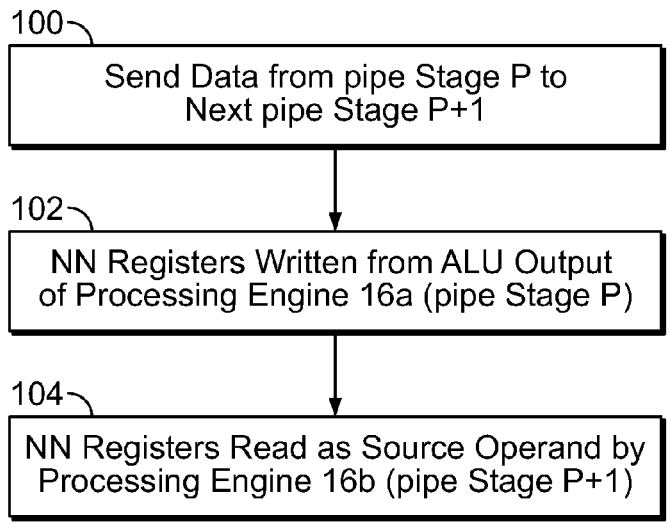
FIG. 6 is a flowchart illustrating the process of a context pipeline where one of the embodiments of the invention may be advantageously practiced.

Referring to FIG. 6, as described above, context pipelining requires that the data resulting from a pipe stage, such as pipe stage P, be sent to the next pipe stage, e.g., pipe stage P+1 (100). Then, Next Neighbor registers can be written from the ALU output of the processing engine 16a in pipe stage P (102), and the Next Neighbor registers can be read as a source operand by the next programming engine 16b at the pipe stage P+1 (104).

Figure 7:
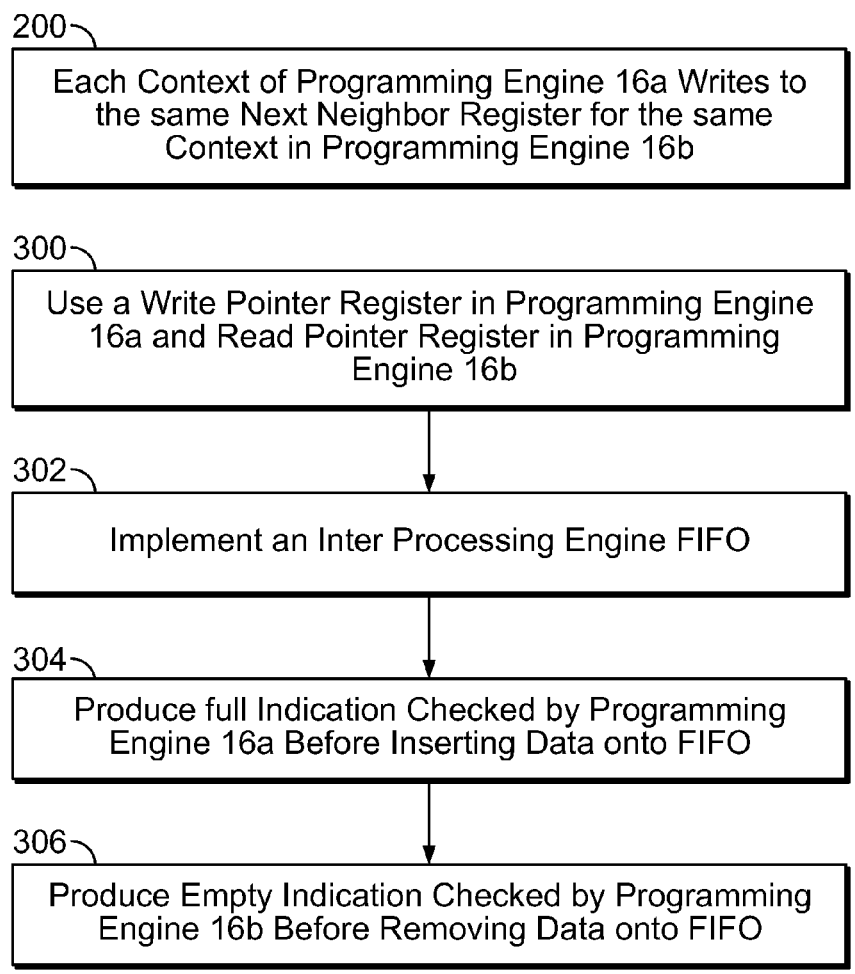
FIG. 7 is a flowchart illustrating the process of determining the address of the Next Neighbor registers.

Referring to FIG. 7, two processes may be used to determine the address of the Next Neighbor registers to be written in the programming engine 16b. In one process, each context of the programming engine 16a may write to the same Next Neighbor registers for the same context in programming engine 16b (200). In another method, a write pointer register in the programming engine 16a and a read pointer register in the programming engine 16b may be used (300) to implement an inter processing engine FIFO (302). The values of write pointer register in the programming engine 16a and the read pointer register in the programming engine 16b are used to produce a full indication checked by the programming engine 16 before inserting data onto the FIFO (304), and an empty indication may be used the programming engine 16b before removing data from the FIFO (306). The FIFO Next Neighbor configuration may provide the elasticity between contexts in the pipe stages P and P+1. When a context in the pipe stage P+1 finds the Next Neighbor FIFO is empty, that context can perform a No-op function, allowing the pipe stage to maintain a predetermined execution rate or "beat" even if the previous pipe stage may not be supplying an input at this same rate.

Other Embodiments:

In the examples described above in conjunction with FIGS. 1-7, the computer processing system 10 may implement programming engines 16 using a variety of network processors.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A processor comprising:
a plurality of programming engines arranged in a pipeline, each programming engine configured to process in parallel a plurality of threads, each programming engine including a plurality of registers for transferring data between the programming engine and an adjacent programming engine, the plurality of registers comprising next neighbor registers configured to receive data from an external entity and selected by a context-relative operation, and wherein the plurality of registers comprises the next neighbor registers arranged in a first-in-first-out configuration and configured to be selected by the context-relative operation or by a ring operation performed with respect to the next neighbor registers arranged in the first-in-first-out configuration.

2. The processor of claim 1 wherein the plurality of registers are configured to assign tasks for packet processing to the plurality of programming engines.

3. The processor of claim 1 wherein the plurality of registers are configured to establish programming stages corresponding to the plurality of programming engines.

4. The processor of claim 1 wherein the plurality of registers support a functional pipeline by a functional pipeline control unit that passes functional data among the plurality of programming engines.

5. The processor of claim 4 further comprising a synchronization unit across the functional pipeline unit.

6. The processor of claim 4 wherein the functional pipeline control unit includes a plurality of functional pipeline stages.

7. The processor of claim 6 wherein each of the plurality of functional pipeline stages perform a different system function.

8. The processor of claim 4 wherein the plurality of programming engines process a data packet in order.

9. The processor of claim 8 wherein the data packet is assigned to multiple contexts of the plurality of programming engines.

10. The processor of claim 4 wherein the plurality of programming engines execute a data packet processing function using the functional pipeline unit.

11. The processor of claim 4 wherein the plurality of programming engines perform inter-thread signaling.

12. The processor of claim 1 wherein the plurality of registers are configured to assign tasks for packet processing to the plurality of programming engines.

13. The processor of claim 1 wherein the plurality of registers are configured to establish programming stages corresponding to the plurality of programming engines.

14. A method of transferring data between programming engines arranged in a pipeline, the method comprising:
reading data from a plurality of data registers of a first programming engine for processing the data in a parallel processor of a pipeline unit, which supports parallel execution of multiple contexts in each of the programming engines;
writing data to a plurality of data registers of a second programming engine, the first and second programming engines being adjacent programming engines, the plurality of registers comprising next neighbor registers configured to receive data from an external entity and selected by a context-relative operation; and
wherein the plurality of registers of the first and second programming engines comprise the next neighbor registers arranged in a first-in-first-out configuration and configured to be selected by the context-relative operation or by a ring operation performed with respect to the next neighbor registers arranged in the first-in-first-out configuration.

15. The method of claim 14 further comprising assigning tasks for packet processing to the plurality of programming engines.

16. The method of claim 14 further comprising establishing programming stages corresponding to the plurality of programming engines and to establish a plurality of pipelines between the programming stages.

17. The method of claim 14 wherein the reading and the writing of data includes supporting a functional pipeline by a functional pipeline control unit that passes functional data among the plurality of programming engines.

18. A computer program product stored on a computer readable medium, the computer program comprising instructions for causing a parallel processor to:
  read data from a plurality of data registers of a first programming engine for processing data in a parallel processor of a pipeline unit, which supports parallel execution of multiple contexts in each of the programming engines;
  write data to a plurality of data registers of a second programming engine, the first and second programming engines being adjacent programming engines of a pipeline, the plurality of registers comprising next neighbor registers configured to receive data from an external entity and selected by a context-relative operation; and
  transfer data between next neighbor registers of the adjacent first and second programming engines based on the context-relative operation in at least one instance and based on a ring operation performed with respect to next neighbor registers arranged in a first-in-first-out configuration in at least another instance.

19. The computer program product of claim 18 further comprising instructions causing the processor to configure the plurality of data registers to assign tasks for packet processing to the plurality of programming engines.

20. An article comprising:
  a storage medium having stored thereon instructions that when executed by a machine results in the following:
  transfer of data from one of a first plurality of registers in an executing programming engine to a one of a second plurality of registers residing in an adjacent programming engine, the programming engines being arranged in a pipeline, each programming engine configured to process in parallel a plurality of threads, at least one of the first or second plurality of registers comprising next neighbor registers configured to receive data from an external entity and selected by a context-relative operation;
  assigning of tasks for packet processing to the programming engines;
  establishing programming stages corresponding to the plurality of programming engines; and
  transfer data using a next neighbor register selected from the next neighbor registers based on the context-relative operation in at least one instance and based on a ring operation performed with respect to the next neighbor registers arranged in a first-in-first-out configuration in at least another instance.

21. The article of claim 20 further comprising instructions to maintain, in the first plurality of registers, a currently operating programming stage of the pipeline, and to maintain, in the second plurality of registers, a subsequent programming stage of the pipeline.

22. A multiprocessing system comprising:
  a plurality of programming engines, each configured to process in parallel a plurality of threads, that includes a plurality of next neighbor registers configured to transfer data from one of a first plurality of registers residing in an executing programming engine to a subsequent one of a second plurality of registers residing in an adjacent programming engine and a synchronization unit to process data packets across a functional pipeline unit, the next neighbor registers configured to receive data from an external entity and selected by a context-relative operation, and wherein the next neighbor registers are arranged in a first-in-first-out configuration and are configured to be selected by the context-relative operation or by a ring operation performed with respect to the next neighbor registers arranged in the first-in-first-out configuration.

23. The multiprocessing system of claim 22 further comprising shared memory locations utilized by a plurality of programming stages of the plurality of programming engines, the shared memory locations including shared variables including a critical section defining the read-modify-write time of the memory locations.

24. The multiprocessing system of claim 22 wherein each of the plurality of programming engines further includes a content addressable memory (CAM).

* * * * *